United States Patent [19]
Hasushita et al.

[11] Patent Number: 5,642,223
[45] Date of Patent: Jun. 24, 1997

[54] TILTING LENS SYSTEM

[75] Inventors: Sachio Hasushita; Shuji Yoneyama; Koichi Maruyama; Takayuki Ito, all of Tokyo, Japan

[73] Assignee: Asahi Kogaku Kogyo Kabushiki Kaisha, Tokyo, Japan

[21] Appl. No.: 443,558

[22] Filed: May 18, 1995

Related U.S. Application Data

[63] Continuation of Ser. No. 71,359, Jun. 3, 1993, abandoned, which is a continuation of Ser. No. 814,472, Dec. 30, 1991, abandoned.

[30] Foreign Application Priority Data

Jan. 17, 1991 [JP] Japan ................... 3-073580
Jan. 17, 1991 [JP] Japan ................... 3-073581

[51] Int. Cl.⁶ .................................................. G02B 27/64
[52] U.S. Cl. ................................... 359/557; 359/554
[58] Field of Search ........................... 359/205–226, 359/554–557, 432–435, 676; 356/248–250; 354/202, 459, 481

[56] References Cited

U.S. PATENT DOCUMENTS

| | | | |
|---|---|---|---|
| 3,593,106 | 7/1971 | Furukawa et al. | 359/557 |
| 3,728,948 | 4/1973 | Fraser | 359/557 |
| 3,942,862 | 3/1976 | Furukawa et al. | 359/557 |
| 3,944,324 | 3/1976 | Tajima et al. | 359/557 |
| 4,213,690 | 7/1980 | Sugiura et al. | 359/207 |
| 4,548,488 | 10/1985 | Honda et al. | 354/402 |
| 4,719,487 | 1/1988 | Johnson | 354/481 |
| 4,911,541 | 3/1990 | Alvarez et al. | 359/557 |
| 4,978,205 | 12/1990 | Sato | 359/557 |
| 4,998,809 | 3/1991 | Tsuji et al. | 359/557 |
| 5,018,845 | 5/1991 | Yamazaki | 359/557 |
| 5,249,079 | 9/1993 | Umeda | 359/557 |

FOREIGN PATENT DOCUMENTS

| | | | |
|---|---|---|---|
| 283771 | 8/1970 | Austria . | |
| 396981 | 11/1990 | European Pat. Off. | 359/554 |
| 2855496 | 7/1980 | Germany . | |
| 264521 | 2/1989 | Germany | 359/823 |
| 55-120013 | 9/1980 | Japan . | |
| 61-31282 | 9/1986 | Japan . | |
| 295526 | 12/1986 | Japan | 359/218 |
| 63-197926 | 8/1988 | Japan . | |
| 145407 | 5/1992 | Japan | 354/429 |

OTHER PUBLICATIONS

Basic Photography—Chapter 6, Camera Movements, Focal Press. Fifth Edition, Michael Langford, pp. 97–110, 1986.
English abstract of Japanese Application No. 55-120013.
Patent Abstracts of Japan, P–802, vol. 12, No. 483, Dec. 16, 1988.
English Language Translation of the German Office Action dated 20 Jan. 1994.

Primary Examiner—Thong Nguyen
Attorney, Agent, or Firm—Greenblum & Bernstein P.L.C.

[57] ABSTRACT

A tilting lens system including a plurality of lens groups in which at least one lens group subsequent to a first lens group can be tilted about a predetermined point on a principal ray axis thereof.

19 Claims, 6 Drawing Sheets

$f_A = 36.0$ mm  $m_T = 1.75$ $L_{HA1} = 1.98$ mm  $d = 6.72$ mm  $L_{H1} = 4.19$ mm $L_{HHA} = 2.65$ mm  $L_{HH} = 2.32$ mm $L_{HA2} = 7.77$ mm  $L_{H2} = 1.08$ mm $L_I = 3.09$ mm $L_O = 1.1$ mm $L_{H1} = 8.22$ mm
$L_{HH} = 5.66$ mm  $L_0 = 0.52$ mm
$L_{H2} = 4.72$ mm $\alpha = -38°$  $\theta = 3°$

TILTING LENS SYSTEM

This application is a continuation, of application Ser. No. 08/071,359, filed Jun. 03, 1993, now abandoned, which is a continuation of application Ser. No. 07/814,472, filed Dec. 30, 1991, now abandoned.

BACKGROUND OF THE INVENTION

1. Field of the Invention

The present invention relates to a lens system that is used in a camera or the like, and more precisely, it relates to a tilting lens system for the focusing or converging of light onto an image plane which is inclined with respect to a principal ray axis (i.e.; an optical axis that is normal to the center of an image plane, such as a photographic film).

2. Description of Related Art

Upon taking a picture with a conventional camera, a swing & tilt operation is effected to focus the image of an object to be taken which is inclined with respect to a plane that is normal to the principal ray axis. The swing & tilt operation is effected when an extension of an object plane, an extension of a plane that is normal to the optical axis of the lens system including a principal point thereof, and an extension of the photographic film plane intersect on a single line (referred to as Scheimpflug's law). Consequently, to effect the swings and tilts in a camera in which the photographic film plane is fixed to the camera body, such as a single lens reflex camera, it is necessary to either adjust the inclination angle of the lens system which is movable or inclinable with respect to the principal ray axis, or to vary the direction of the camera body with respect to the object to be taken to thereby adjust the angle of the principal ray axis with respect to the object. Thus, the center of the object can be made coincidental with the center of the image plane when the requirements of the swing & tilt operation are satisfied in accordance with Scheimpflug's law, as mentioned above. Note that, in general, the terms "swing" and "tilt" mean inclinations of the lens system in the lateral (right and left) direction and in the vertical direction, respectively. The term "tilt" (including tilting or tilted) referred to herein means the inclinations in both the lateral and vertical directions. Namely, in the present invention, the direction of the inclination of the lens system is not limited to a specific direction.

In a known inclinable (tiltable) lens system having first and second principal points which are separated from each other, the inclination of the lens system causes the image of an object to be moved on a photographic film plane. Accordingly, it is necessary to move and adjust the position of the film during the focusing operation in order to take a picture of an object on a predetermined position of the film upon the swing & tilt operation (so-called back focusing). Therefore, it is necessary to make two different adjustments with regard to the center of the object and the focusing of the lens system onto the tilted object. Consequently, these adjustments cause the photographer to be distracted upon taking a picture.

Furthermore, in a conventional camera, the swing & tilt operation can be effected only in a fixed focal length type lens system. Namely, there is no zoom lens which can change the focal length, in which the swing & tilt operation can be effected.

SUMMARY OF THE INVENTION

A primary object of the present invention is to provide a tilting lens system in which there is no deviation of the optical axis of an object image even when the swing & tilt operation of the lens system is effected.

Another object of the present invention is to provide a tilting lens system which can be mounted to an existing lens system to effect a simple swing & tilt operation thereof.

Still another object of the present invention is to provide a tilting lens system which can be applied to a zoom lens.

Still another object of the present invention is to provide a tilting lens system in which there is no deviation of the center of an object image from a principal ray axis, even during a zooming of the lens system.

To achieve the objects mentioned above, according to the present invention, there is provided a tilting lens system comprising more than one lens group in which at least one lens group subsequent to a first lens group can be tilted about a predetermined point on a principal ray axis thereof.

In a preferred embodiment, there is the following relationship:

$$L2/L1 = mT,$$

wherein mT denotes a lateral magnification of the tilting lens group, L1 denotes a distance between a tilting point and a first principal point, and L2 denotes a distance between the tilting point and a second principal point.

According to another aspect of the present invention, a tilting lens system can be realized as an adaptor lens system which is detachably mounted in front of an existing master lens system, wherein at least a part of the lenses of the tilting lens sytem can be tilted about a predetermined point on a principal ray axis thereof.

In this aspect of the invention, it is preferable that the following relationship is satisfied:

$$L2/L1 = mT,$$

wherein mT denotes the lateral magnification of the tilting lens group, L1 denotes the distance between the tilting point and the first principal point, and L2 denotes the distance between the tilting point and the second principal point.

According to still another aspect of the present invention, there is provided a tilting zoom lens system that has at least two movable lens groups, including at least one variable power lens group, comprising a tilting lens group that is located in front of a variable power lens group, wherein at least a part of the lenses of the tilting lens group can be tilted about a predetermined point on a principal ray axis thereof.

Preferably, the tilting lens group is constituted by the lens group that is closest to an object to be taken.

In a preferred embodiment, the tilting lens group is tilted about a second principal point thereof.

Also, in the zoom lens system mentioned above, there is the following relationship:

$$L2/L1 = mT,$$

wherein mT, denotes the lateral magnification of the tilting lens group, L1 denotes the distance between the tilting point and the first principal point thereof, and L2 denotes the distance between the tilting point and the second principal point thereof.

BRIEF DESCRIPTION OF THE DRAWINGS

The invention will be described below in detail with reference to the accompanying drawings, in which.

DESCRIPTION OF THE PREFERRED EMBODIMENTS

FIGS. 1 through 7 show a first embodiment of the present invention, applied to a lens having a fixed focal length.

Figure 1:
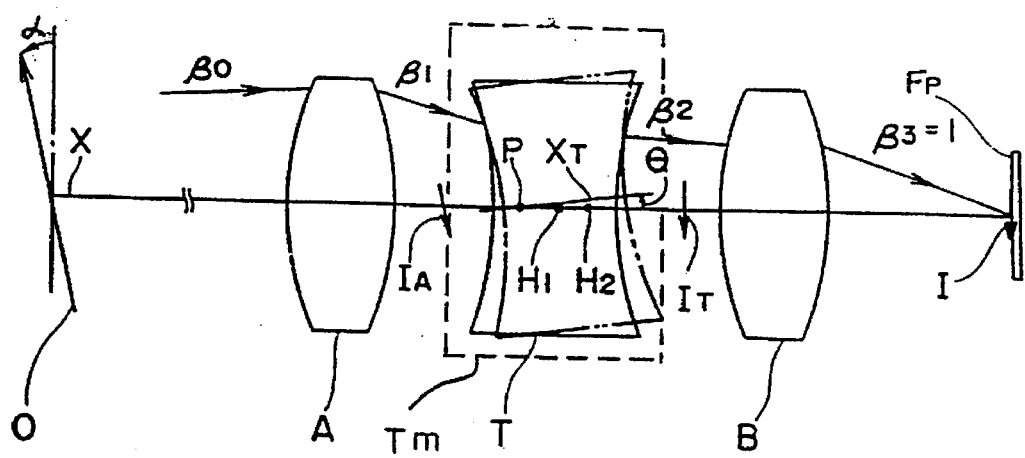
FIG. 1 is a conceptual view of a tilting lens system applied to a single lens system having a constant focal length, according to the present invention.

In FIG. 1, "O" and "Fp" designate an object to be taken and an image plane, such as a film on which the object image O is formed, respectively. The lens system comprises a front lens group A which is movable along a principal ray axis X to effect a focusing, a tilting lens group T having an optical axis XT that is inclinable with respect to the principal ray axis X, and a rear lens group B for converging light of the object onto the image plane Fp. In this lens system, a primary image IA of the object O formed by the front lens group A is reformed on the image plane Fp as a secondary image IT of a predetermined lateral magnification by the tilting lens group T. The secondary image IT is then converged onto the image plane Fp as an object image I by the rear lens group B. The tilting lens group T, having first and second principal points H1 and H2, rotates about a point P on the principal ray axis X in the vertical direction to optionally change the inclination angle θ of the optical axis XT of the tilting lens group T with respect to the principal ray axis X. Note that the direction of the inclination of the tilting lens group T is not practically limited to the vertical direction and can be any direction, as mentioned above.

In the tilting lens system as constructed above, the requirements needed to eliminate the possible deviation of the image I from the principal ray axis X will be discussed below.

Figure 2:
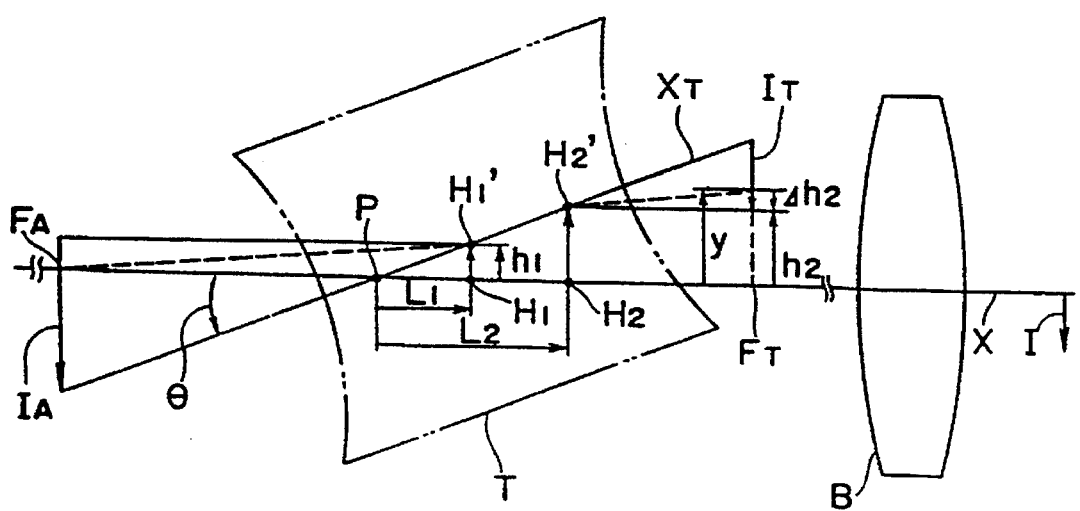
FIG. 2 is a schematic view of a tilting lens system showing how a tilt center about which a lens rotates is determined.

Here, it is assumed that the paraxial tilt angles of light incident on and outgoing from the lens groups A, T and B are $\beta 0$, $\beta 1$, $\beta 2$, $\beta 3$, respectively in this order from the front. In FIG. 2, if the tilting lens group T rotates through an angle θ about the point P which is located at distances L1 and L2 from the first and second principal points H1 and H2, respectively, the first and second principal points H1 and H2 are moved to H1' and H2', respectively. Consequently, image IA formed at focal point FA by the front lens group A is formed at focal point FT as an image IT by the tilting lens group T. Height (distance) h1 of the point H1' from the point H1 is equal to L1·θ (h1=L1·θ). Similarly, height (distance) h2 of point H2' from point H2 is equal to L2·θ (h2=L2·θ). Deviation (height) Δh2 of image IT caused by the displacement (=height h1) of the principal point H1 to the point H1' is given by Δh2=mT·h1, wherein mT is a lateral magnification by the tilting lens group T and is represented by mT=β1/β2. Thus, lateral deviation y of image IT with respect to the principal ray axis X is given by y=h2−Δh2. Namely, y=L2·θ−mT·L1·θ.

When y=0, the lateral deviation of the image I can be eliminated. Namely, to eliminate the lateral deviation of the image I, L2/L1=mT.

Figure 3:
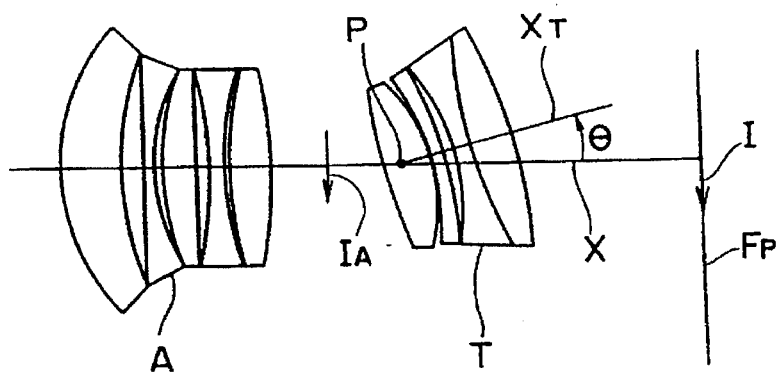
FIG. 3 is a schematic view of a lens system according to a first embodiment of the present invention.

FIG. 3 shows an example of a concrete arrangement of the tilting lens system according to the present invention. The tilting lens system shown in FIG. 3 comprises two lens groups (front lens group and tilting lens group) A and T without the rear lens group B as in FIG. 1. The front lens group A is a focusing lens group and includes three positive lenses and two negative lenses in combination, and is movable in the optical axis direction to form and focus the object image I on the image plane Fp. Furthermore, the tilting lens group T located behind the front lens group A includes the combination of two positive lenses and two negative lenses and is rotatable about the point P to adjust the tilt angle θ of the optical axis XT of the tilting lens group T with respect to the principal ray axis X.

The following is an applied example, using numerical data.

Figure 4:
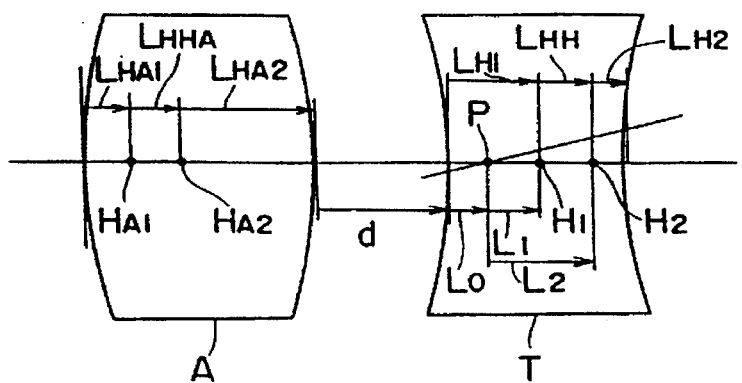
FIG. 4 is an explanatory view showing how to determine a point P in FIG. 3.

In an example shown in FIG. 4, focal length fA of the front lens group A, distance LHA1 of the first principal point HA1 from the first plane (front plane) of the front lens group A on the optical axis, distance LHHA between the first principal point HA1 and the second principal point HA2 on the optical axis, and distance LHA2 of the second principal point HA2 from the second plane (rear plane) of the front lens group A, are as follows:

fA=36.0 mm; LHA1=1.98 mm; LHHA=2.65 mm; and LHA2=7.77 mm.

Lateral magnification mT of the tilting lens group T, distance LH1 of the first principal point H1 from the first plane (front surface) of the tilting lens group T on the optical axis, distance LHH between the first principal point H1 and the second principal point H2 on the optical axis, and distance LH2 of the second principal point H2 from the second plane (rear surface) of the tilting lens group T, are as follows:

mT=1.75; LH1=4.19 mm; LHH=2.32 mm; and LH2=1.08 mm.

Lens distance d between the rear surface of the front lens group A and the front surface of the tilting lens group T is d=6.72 mm. Back focus fB of the whole lens system is fB=29.24 mm.

When the primary image IA formed by the front lens group A is focused onto the image plane Fp as an object image I by the tilting lens group T, L2/L1=(L1+2.32)/L1=1.75 is obtained from L2/L1=mT mentioned above, wherein L1 and L2 (mm) designate the distances of the first and second principal points H1 and H2 of the tilting lens group T from point P (center of tilting), respectively. In this example, L2=L1+2.32. As a result, L1=3.09 mm is obtained. No lateral deviation of the object image I occurs when point P is set to be a point spaced forward from the first principal point H1 by a distance 3.09 mm. Point P is spaced from the first plane (front surface) of the tilting lens group T by a distance L0=LH1−L1=1.1 mm.

Using this data, the individual values shown in FIG. 2 are as follows:

h1 (height of the first principal point H1)=3.09 θ;

h2 (height of the second principal point H2)=5.41 θ;

Δh2=1.75×3.09 θ.

As a result, the lateral deviation y=h2−Δh2=L2·θ−mT·L1·θ=5.41 θ−1.75×3.09 θ. Thus, y≈0.

Consequently, in the tilting lens system of the illustrated embodiment, the tilting lens group T is rotated about point P to change angle θ of optical axis XT with respect to the principal ray axis X, so that the angle of the image plane Fp with respect to the object O can be adjusted. This makes it possible to converge the object image I in a plane that is inclined with respect to the principal ray axis X onto the image plane.

Furthermore, lateral deviation y of the object image I with respect to the principal ray axis X can be made substantially zero by rotating the tilting lens group T about point P. Namely, no displacement of the object image I occurs on the image plane Fp even when the tilting lens group T rotates about point P. Consequently, the object image can be positioned at a predetermined position of the image plane without changing the direction of the camera with respect to the object. Therefore a picture of the object can be easily taken.

Figure 5:
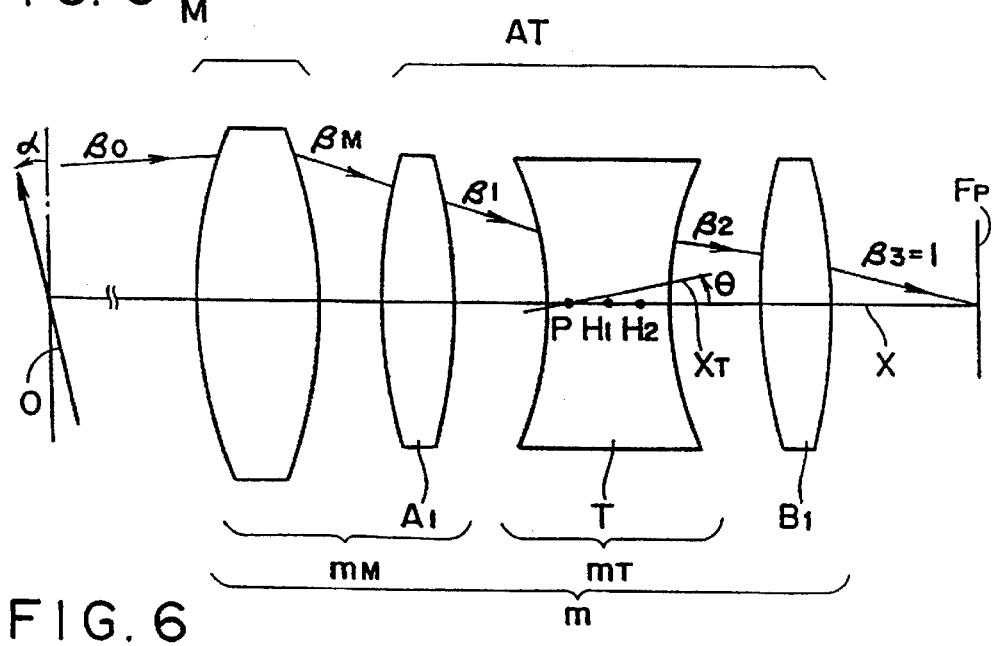
FIG. 5 is a schematic view of an adaptor lens system according to the present invention.

FIG. 5 shows another embodiment of the present invention which is realized by an adaptor lens system AT. The tilting adaptor lens system AT of the present invention is usually provided behind a master lens system M and comprises a front stationary lens group A1, a tilting lens system T and a rear stationary lens system B1. The tilting lens system T is inclinable with respect to principal ray axis X. In this arrangement, the rotation (inclination) of the tilting lens system T makes a swing & tilt operation possible, similar to the aforementioned embodiment. In the optical system illustrated in FIG. 5, inclination angle α of object O and tilt angle θ of the tilting lens group T satisfy the following relationship:

$$\tan \alpha = (1/mM)(1-1/mT) \tan \theta$$

wherein mM denotes a resultant lateral magnification of master lens system M and the front stationary lens group A1, and mT denotes the lateral magnification of the tilting lens group T, respectively. In FIG. 5, "βM" designates a paraxial inclination angle of an outgoing light emitted from the master lens system M.

Figure 6:
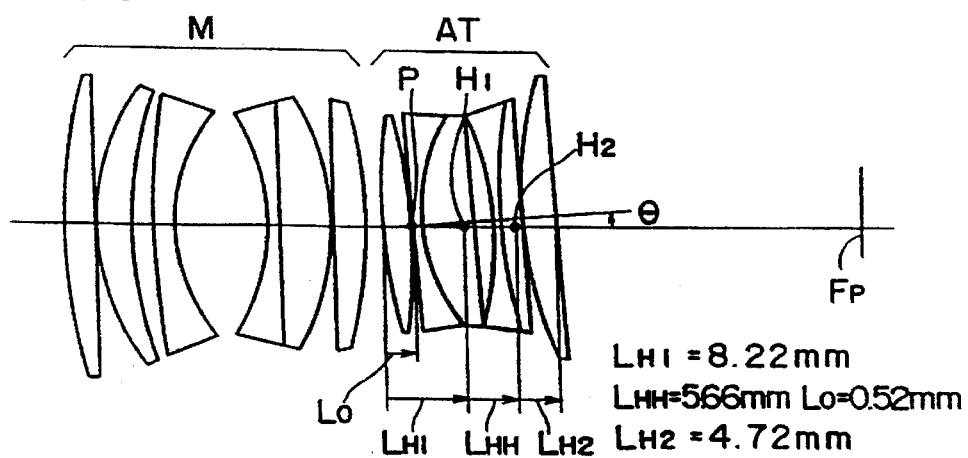
FIG. 6 is a schematic view of a lens system, based on FIG. 5, according to a second embodiment of the present invention.

FIG. 6 shows a modified embodiment of FIG. 5. In FIG. 6, whole adaptor lens system AT provided behind the master lens system M constitutes the tilting lens group T. By way of example, the distances LH1, LHH and LH2 between the first principal point H1 of the tilting lens system At and the first plane thereof, between the first principal point H1 and the second principal point H2, and between the second principal point H2 and the terminal end plane of the tilting lens group T are LH1=8.22 mm, LHH=5.66 mm, and LH2=4.72 mm, respectively. The lateral magnification mT of the adaptor lens system AT is mT=1.735 mm. Thus, L1=7.70 mm is obtained from L2/L1=mT. As a result, distance L0 between point P and the first plane of the tilting lens system AT is L0=0.52 mm. Consequently, the deviation of the object image I formed on the image plane Fp can be substantially zero when the tilting lens group T rotates about point P located at a distance L0(=0.52 mm) from the first plane of the adaptor lens system AT on the principal ray axis X.

Figure 7:
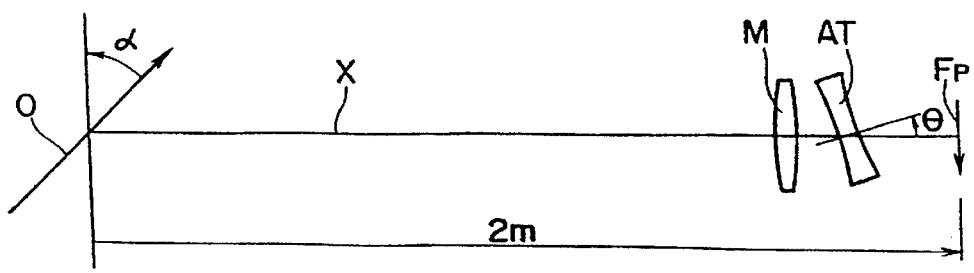
FIG. 7 is an explanatory view showing calculation results of tilt angles of the lens system shown in FIG. 6, by way of example.

In the arrangement illustrated in FIG. 6, if the object O is inclined forward by an inclination angle α with respect to a plane perpendicular to the principal ray axis X, as shown in FIG. 7, and it is assumed that the image plane Fp is located at a distance of 2m from the center of the object O and the lateral magnification mM of the master lens system M is mM=−0.028, the following relationship is satisfied, as mentioned above:

$$\tan \alpha = (1/mM)(1-1/mT) \tan \theta = ((1/mM)-(1/m)) \tan \theta$$

wherein m designates a resultant lateral magnification of the whole lens system including the master lens system M and the tilting lens system AT.

For example, if a=−38° and m=−0.048, θ=3°. Namely, focusing is achieved when the optical axis XT of the tilting lens group T is inclined by 3° with respect to the principal ray axis X.

As can be understood from the above discussion, according to the present invention, at least one lens group subsequent to the first lens group is tiltable, and the center of the tilting about which the tilting lens group rotates is located to satisfy the equation L2/L1=mT, so that no deviation of the object image from the principal ray axis occurs even when the swing & tilt is effected. Consequently, it is not necessary to move the camera in order to form an object image in a predetermined position of the image plane. This simplifies the picture taking operation during the swing & tilt operation.

Furthermore, since the adaptor lens system can be detachably mounted behind the master lens system, swing & tilt photographing can be easily realized in an existing lens system.

In addition, if focusing is carried out by the lens group in front of the tilting lens group, the lateral magnification of the tilting lens group is constant. Accordingly, the center P of rotation (tilting) is fixed for any object distance, resulting in a simple tilting mechanism.

FIGS. 8 through 12 show an embodiment of the present invention applied to a zoom lens.

Figure 8A:
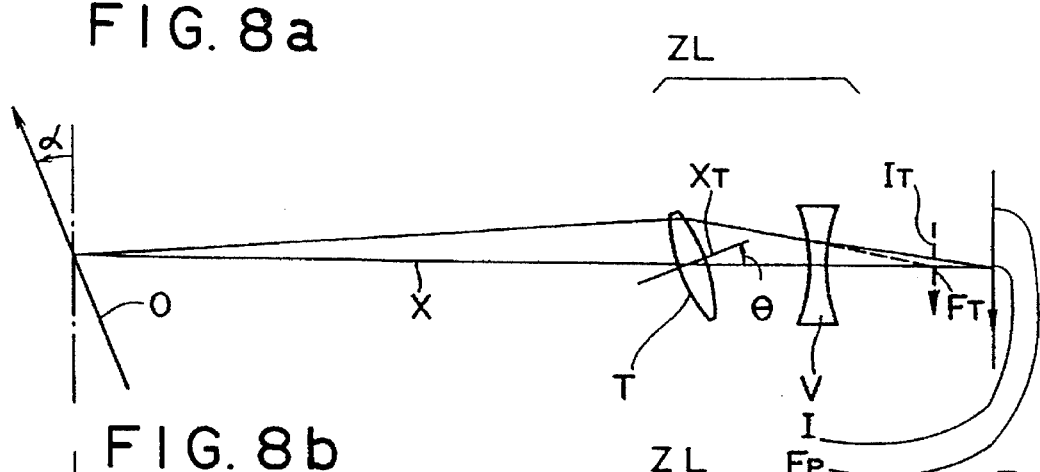
FIGS. 8a and 8b are schematic views of a thin lens system applied to a zoom lens on short and long focal length sides, respectively, according to the present invention.
Figure 8B:
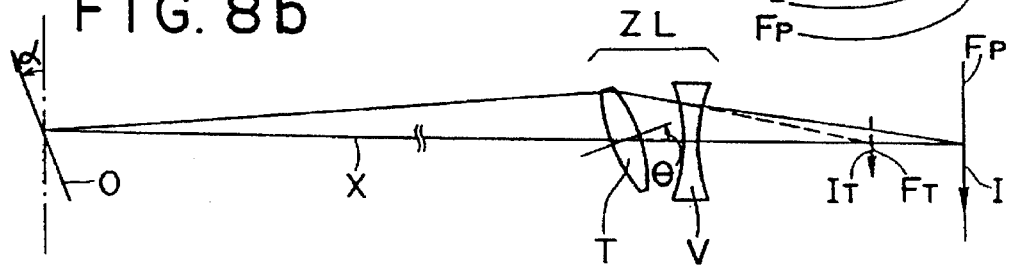

FIGS. 8a and 8b show the tilting lens system on a short focal point side and a long focal point side, respectively.

Zoom lens system ZL comprises two lens groups, i.e., a first lens group constituting the tilting lens group T in which optical axis XT thereof can be tilted with respect to the principal ray axis X of the zoom lens system ZL, and a second lens group comprising a variable power lens group V which is movable along the principal ray axis X to change the focal length of the whole zoom lens system ZL to thereby effect the zooming operation.

Alternatively, it is possible to make the tilting lens group T movable in the optical axis direction independently of the variable power lens group V to effect the zooming.

If the object O is inclined at an angle α with respect to a plane that is normal to the principal ray axis X, the object image IT is formed at focal point FT to be parallel with the image plane Fp when the optical axis XT of the tilting lens group T is inclined by angle θ with respect to the principal ray axis X. At the same time, the variable power lens group V is moved along the principal ray axis X to converge object image IT on the image plane FP at a predetermined magnification as an object image I.

Since the object image IT is focused to be parallel with the image plane Fp at the focal point FT by tilting the tilting lens group T, as mentioned above, the focused state with respect to the inclined object plane on the image plane Fp can be maintained even when the variable power lens group V is moved thereafter to effect the zooming.

Figure 13A:
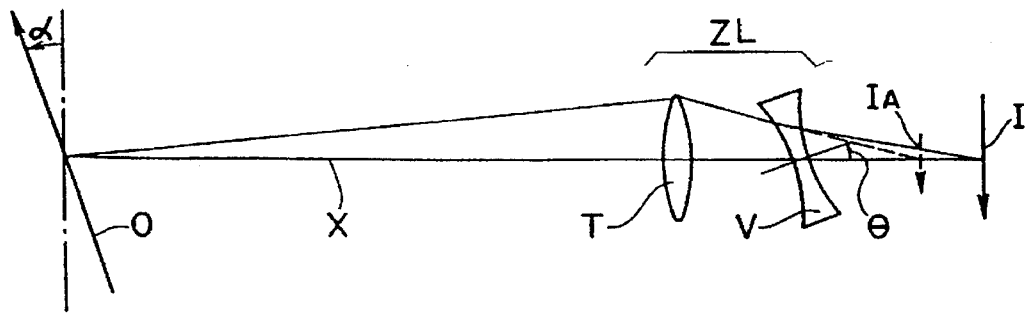
Figure 13B:
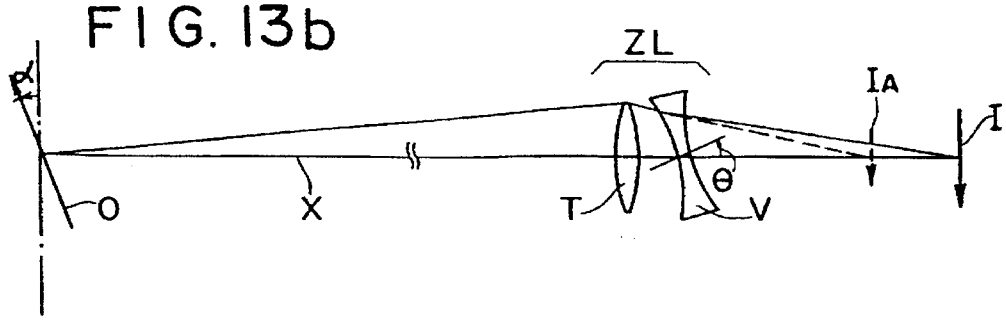

FIGS. 13a and 13b show conceptual views of the optical system on the short focal point side and the long focal point side, respectively, when variable power lens group V is tilted without tilting the tilting lens group T.

When the variable power lens group V is tilted, inclination angle $\alpha$ of the inclined object and tilt angle $\theta$ of the variable power lens group V satisfy the following relationship:

$$\tan \alpha = ((\beta 1 - \beta 2)/\alpha 0) \cdot \tan \theta$$

From this equation, we have:

$$\tan \alpha = (1/mT)(1 - 1/mV) \tan \theta$$

$$\tan \theta = (mT/(1 - 1/mV)) \tan \alpha$$

wherein mT denotes the lateral magnification of the tilting lens group T, and mV denotes a lateral magnification of the variable power lens group V, respectively. The lateral magnification mV is given by mV=f/fT, wherein f denotes the focal length of the whole lens system, and fT denotes a focal length of the tilting lens group T, respectively. Consequently, if the variable power lens group V is tilted, tilt angle $\theta$ thereof must be adjusted together with the movement of the variable power lens group V in the optical axis direction in order to change the focal length and the lateral magnification thereof during zooming. This results in a complicated swing & tilt operation.

Figure 9:
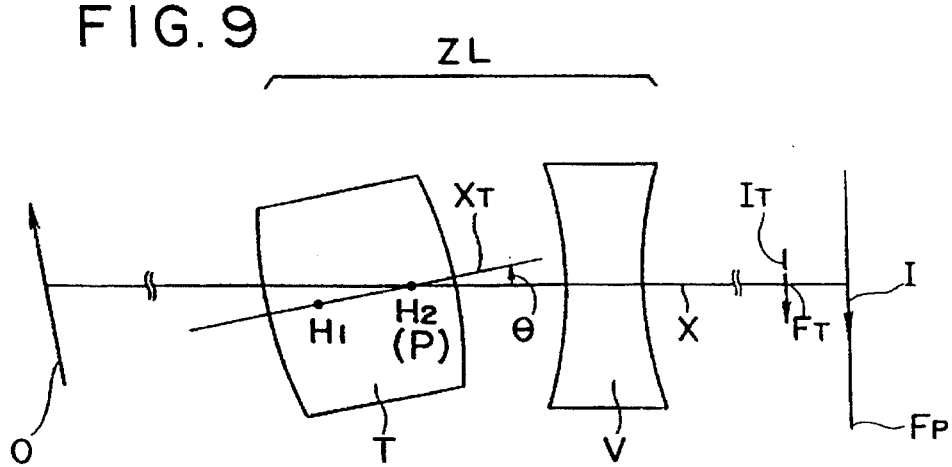
FIG. 9 is a schematic view of the thin lens system shown in FIGS. 8a and 8b, showing how to determine a tilt center about which the lens rotates.

FIG. 9 shows a tilting lens group T made of a thick lens in a zoom lens system. The whole tilting lens group T is tiltable about point P on the principal ray axis X. Point P is coincidental with the second principal point H2 of the tilting lens group T. H1 is the first principal point of the tilting lens group T. When the tilting lens group T is rotated about point P, i.e., the second principal point H2 of the tilting lens group T, as mentioned above, the focused state is maintained when the variable power lens group V is moved (i.e. during zooming), as long as the object image IT is formed at the focal point FT thereof. Furthermore, displacement of the object image I on the image plane Fp does not occur during zooming.

Figure 10A:
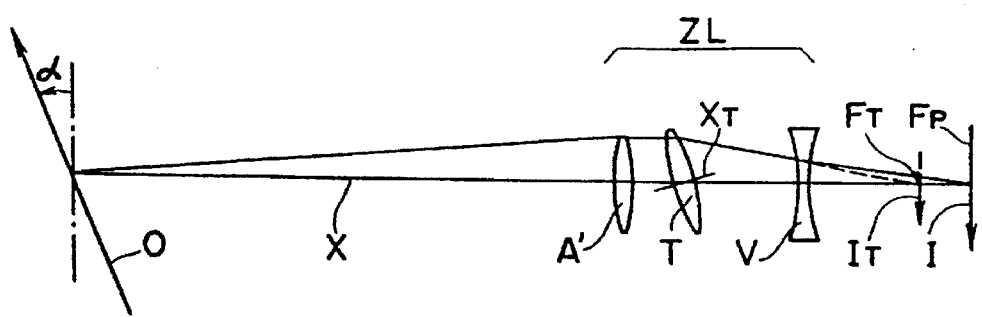
FIGS. 10a and 10b are schematic views of a thin lens system applied to a zoom lens on short and long focal length sides, respectively, according to another embodiment of the present invention.
Figure 10B:
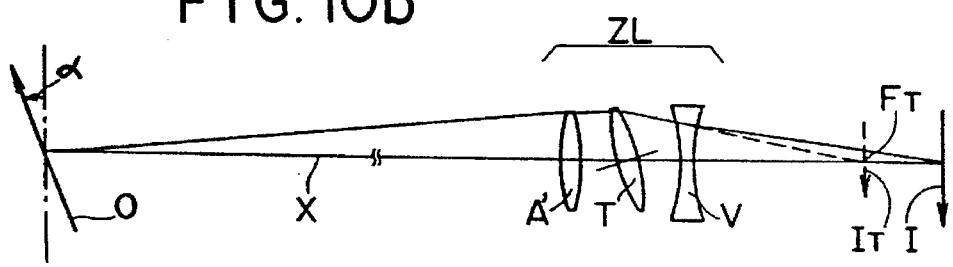

FIGS. 10a and 10b show a modified embodiment of the present invention, in which first lens group of zoom lens group ZL comprises a of a plurality of lens groups. In the illustrated embodiment, the zoom lens group ZL includes three lens groups in the illustrated embodiment. FIGS. 10a and 10b show a short focal length side and a long focal length side, respectively. The first lens group comprises a stationary lens group A' along with the tilting lens group T. Only the tilting lens group T is tilted to effect the swing & tilt operation. The second lens group comprises a variable power lens group V which is movable on and along the principal ray axis X so as to effect the zooming operation. Alternatively, it is possible to effect the zooming operation by independently moving both the first lens group (stationary lens group A' and the tilting lens group T) and the variable power lens group V along the principal ray axis X.

In the zoom lens system ZL shown in FIGS. 10a and 10b, the tilting lens group T comprises a part of the first lens group provided in front of the variable power lens group V; i.e., the intermediate lens between the three lens groups in the illustrated embodiment. The tilt of the tilting lens group T ensures that the object image IT is formed at the focal point FT to be parallel with the image plane Fp and that the focused state of the object image will be retained, even during zooming, by the variable power lens group V.

Figure 11:
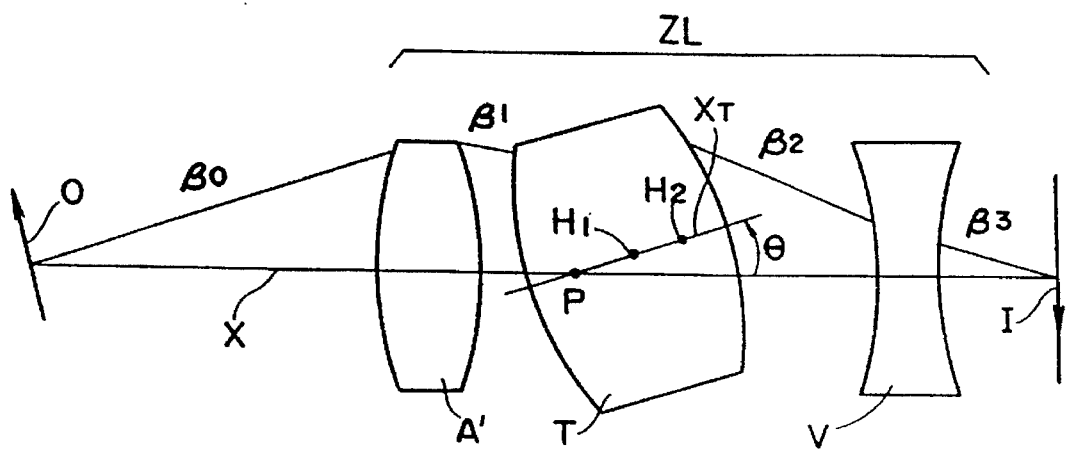
FIG. 11 is a view of a thick lens system, similar to FIG. 9.

FIG. 11 shows a modification of FIGS. 10a and 10b, in which the lens systems are all made of thick lenses. The first lens group of the zoom lens system ZL comprises a front stationary lens group A' and a rear tilting lens group T. The tilting lens group T has first and second principal points H1 and H2 and is rotatable about point P on principal ray axis X, for example, in the vertical direction to optionally change tilt angle $\theta$ of optical axis XT with respect to the principal ray axis X.

Here, it is assumed that the paraxial inclination angles of light incident upon and outgoing from the stationary lens group A', the tilting lens group T, and the variable power lens group V are $\beta 0$, $\beta 1$, $\beta 2$, and $\beta 3$, respectively.

Figure 12:
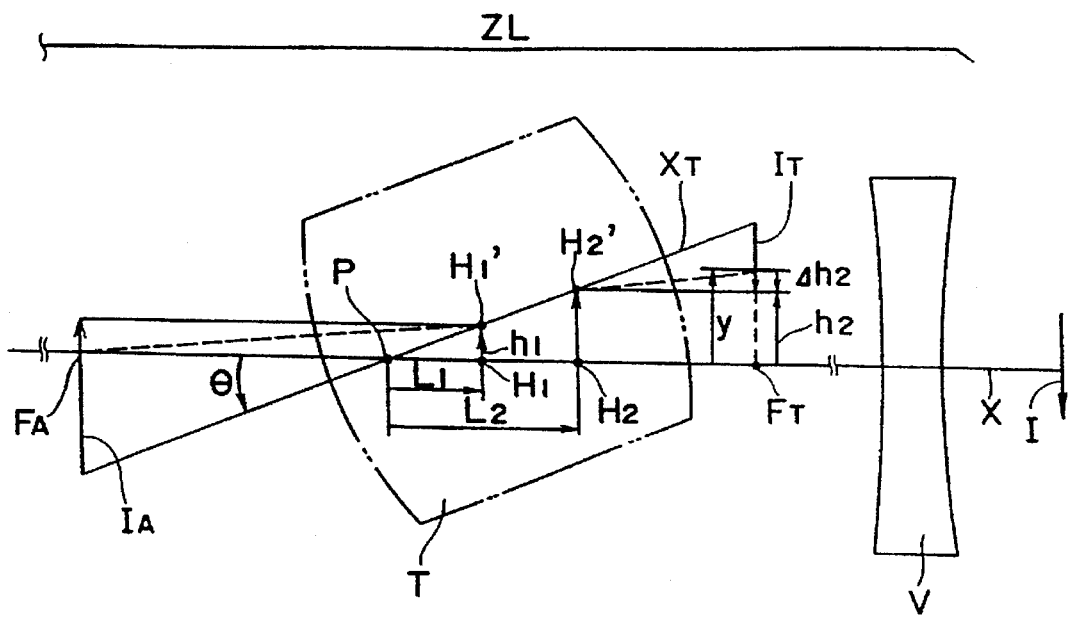
FIG. 12 is a schematic view of a thick lens system shown in FIG. 11, showing how to determine a tilt center about which the lens rotates; and, FIGS. 13a and 13b are schematic views of a conventional thin lens system in comparison with the lens system shown in FIGS. 8a and 8b.

In FIG. 12, if tilting lens group T rotates by an angle $\theta$ about point P which is located at distances L1 and L2 from first and second principal points H1 and H2, respectively, the first and second principal points H1 and H2 are moved to H1' and H2', respectively. Consequently, image IA formed at focal point FA by the stationary lens group A' is formed at focal point FT as an image IT by the tilting lens group T. Height (distance) h1 of the point H1' from the point H1 is equal to L1·$\theta$ (h1=L1·$\theta$). Similarly, height (distance) h2 of the point H2' from the point H2 is equal to L2·$\theta$ (h2=L2·$\theta$). Deviation (height) $\Delta$h2 of the image IT caused by the displacement (=height h1) of the principal point H1 to the point H1' is given by $\Delta$h2=mT·h1, wherein mT is a lateral magnification of the tilting lens group T and is represented by mT=$\beta 1/\beta 2$. Thus, lateral deviation y of the image IT with respect to the principal ray axis X is given by y=h2–$\Delta$h2. Namely, y=L2·$\theta$–mT·L1·$\theta$.

Consequently, if the tilting lens group T is tilted about point P, thereby satisfying the above-mentioned relationship, the object image is formed at the focal point FT without any displacement of the object image on the image plane Fp due to the tilting of the lens group T.

Furthermore, not only can the focused state be held during the movement of the variable power lens group, but also, there is no displacement of the image on the image plane during zooming.

As can be seen from the foregoing, according to the present invention, since the whole or part of the lens group located in front of the variable power lens group can be tilted with respect to the principal ray axis, swing & tilt photographing can be effected by the tilting operation, and the focused state can be retained even during zooming. Furthermore, if the lens group closest to the object to be taken is tiltable about the second principal point thereof, no movement of the image is caused by zooming. In addition to the foregoing, if the tilting lens group satisfies the equation L2/L1=mT, no movement of the image occurs when tilting and zooming are effected.

We claim:

1. A tilting lens system including a focusing lens, for performing tilt photography with a camera comprising:

a tilting lens group;

a non-tilting lens group;

means for mounting said tilting lens group such that a photographer can perform a tilt operation to tilt said tilting lens group independently of camera movement about a fixed point located within said tilting lens group and on an optical axis of said tilting lens group, wherein a focused image of an object to be photographed is formed on an image plane of the camera when a plane of the object to be photographed is inclined with respect to the image plane of the camera, wherein said tilting lens group is positioned in a predetermined tilted position throughout a tilt photography operation.

2. The tilting lens system according to claim 1, wherein a following relationship is satisfied;

$$L2/L1 = mT$$

wherein mT denotes a lateral magnification of said tilting lens group, L1 denotes a distance between said fixed point and a first principal point of said tilting lens group, and L2 denotes a distance between said fixed point and a second principal point of said tilting lens group.

3. The tilting lens system according to claim 1, further comprising a lens group positioned between said tilting lens group and an object to be photographed, wherein at least a part of said non-tilting lens group is movable to effect a focusing operation.

4. The tilting lens system according to claim 1, said tilting lens group comprising a lens group that is closest to an object to be photographed.

5. The tilting lens system according to claim 1, said mounting means comprising means for changing a tilt angle of said tilting lens group by an amount compensating for tilting of an object to be photographed.

6. A tilting lens system including a focusing lens, for performing tilt photography with a camera comprising:
   an adaptor lens system, detachably mounted between a rear lens of a master lens system and the camera such that a photographer can perform a tilt operation to tilt at least one lens of said adaptor lens system independently of camera movement about a fixed point located within said adaptor lens system and on an optical axis of said adaptor lens system, such that a focused image of an object to be photographed is formed on an image plane of the camera when a plane of the object to be photographed is inclined with respect to the image plane of the camera, wherein said at least one lens is positioned in a predetermined tilted position throughout a tilt photography operation.

7. The tilting lens system according to claim 6 wherein a following relationship is satisfied:

$$L2/L1 = mT$$

wherein mT denotes a lateral magnification of said adaptor lens system, L1 denotes a distance between said fixed point and a first principal point of said adaptor lens system, and L2 denotes a distance between said fixed point and a second principal point of said adaptor lens system.

8. The tilting lens system according to claim 6, wherein said adaptor lens system comprises a stationary lens and a tilting lens.

9. A tilting zoom lens system including a focusing lens, for performing tilt photography with a camera comprising at least two movable lens groups, at least one of said two movable lens groups comprising a variable power lens group, and one of said two movable lens groups comprising a tilting lens group, said tilting lens group located in front of said at least one of said at least two movable lens groups, means for mounting at least part of said tilting lens group such that a photographer can perform a tilt operation to tilt said tilting lens group independently of camera movement about a fixed point located within said tilting lens group and on an optical axis of said tilting lens group, such that a focused image of an object to be photographed is formed on an image plane of the camera when a plane of the object to be photographed is inclined with respect to the image plane of the camera, wherein said tilting lens group is positioned in a predetermined tilted position throughout a tilt photography operation.

10. The tilting zoom lens system according to claim 9, wherein said tilting lens group comprises a lens group that is located closest to an object to be taken.

11. The tilting zoom lens system according to claim 10, wherein said fixed point is a principal point of said tilting zoom lens system, such that a focused condition is maintained during a zooming operation.

12. A tilting zoom lens system according to claim 11, wherein said tilting lens group comprises a stationary lens and a tilting lens.

13. The tilting lens system according to claim 9, said system comprising a front lens group, an intermediate lens group, and a rear lens group, said tilting lens group comprising said intermediate lens group.

14. The tilting zoom lens system according to claim 9, said mounting means comprising means for changing a tilt angle of said tilting lens group by an amount compensating for tilting of an object to be photographed.

15. An apparatus for tilting a lens usable for performing tilt photography with a camera, said apparatus comprising:
   an optical system having a plurality of lenses including at least one focusing lens;
   means for enabling a photographer to perform a tilt operation to tilt at least one of said plurality of lenses independent of camera movement about a fixed point located within said at least one of said plurality of lenses and on an optical axis of said at least one of said plurality of lenses, such that a focused image of an object to be photographed is formed on an image plane of the camera when a plane of the object to be photographed is inclined with respect to the image plane of the camera, wherein said at least one of said plurality of lenses is positioned in a predetermined tilted position throughout a tilt photography operation.

16. The apparatus for tilting a lens according to claim 15, wherein a following relationship is satisfied:

$$L2/L1 = mT$$

wherein mT represents a lateral magnification of said at least one of said plurality of lenses that is tiltable by said tilt enabling means;
L1 represents a distance between said fixed point and a first principal point of said at least one of said plurality of lenses; and
L2 represents a distance between said fixed point and a second principal point of said at least one of said plurality of lenses.

17. The apparatus for tilting a lens according to claim 15, wherein a first lens of said plurality of lenses, closest to an object to be photographed, is movable to effect a focusing operation.

18. The apparatus of claim 17, wherein said first lens is positioned in front of said at least one lens that is tilted by said tilt enabling means, such that said at least one lens that is tilted by said tilt enabling means is closer to said plane on which said object image is formed than to said first lens.

19. The apparatus for tilting a lens according to claim 15, wherein said optical system comprises an detachably mounted adaptor lens system and means for mounting said adaptor lens system between a master lens system and a camera.

* * * * *